United States Patent [19]

Futamura

[11] Patent Number: 4,778,852
[45] Date of Patent: Oct. 18, 1988

[54] ROOFING COMPOSITION
[75] Inventor: Shingo Futamura, Wadsworth, Ohio
[73] Assignee: The Firestone Tire & Rubber Company, Akron, Ohio
[21] Appl. No.: 34,365
[22] Filed: Apr. 6, 1987
[51] Int. Cl.$^4$ ............................................. C08L 53/00
[52] U.S. Cl. ..................... 525/97; 524/505; 525/99
[58] Field of Search .................... 525/97, 99
[56] References Cited

U.S. PATENT DOCUMENTS

| 3,443,543 | 5/1969 | Gruver | 525/98 |
|---|---|---|---|
| 3,526,606 | 9/1970 | Minekawa et al. | 260/5 |
| 3,634,549 | 1/1972 | Shaw et al. | 260/880 |
| 4,102,849 | 7/1978 | Bouton et al. | 260/33.6 |
| 4,177,184 | 12/1979 | Condon | 260/32.6 |
| 4,248,758 | 2/1981 | Wright | 260/33.6 |
| 4,313,867 | 2/1982 | Duvdevani | 260/33.6 |
| 4,442,253 | 4/1984 | Lundberg et al. | 524/211 |
| 4,461,875 | 7/1984 | Crepeau | 525/348 |
| 4,491,652 | 1/1985 | Matthews et al. | 525/247 |
| 4,514,442 | 4/1985 | Crepeau | 427/140 |

Primary Examiner—Jacob Ziegler
Attorney, Agent, or Firm—Frank J. Troy, Sr.

[57] ABSTRACT

A roofing composition comprising a blend of a thermoplastic elastomer containing at least two polymer blocks wherein one of said polymer blocks is a crystalline polymer block and one of said polymer blocks is an amorphous polymer block, and a vulcanizable elastomer selected from the group consisting of EPDM, butyl, neutralized sulfonated EPDM, neutralized sulfonated butyl and mixtures thereof. The roofing compositions have particular application as roofing membranes (i.e. roof sheeting) or roof flashing materials.

13 Claims, No Drawings

ROOFING COMPOSITION

BACKGROUND OF THE INVENTION

The invention relates to a roofing composition comprising a blend of a thermoplastic elastomer and a vulcanizable elastomer. More particularly, the invention relates to a roofing composition comprising a blend of a thermoplastic elastomer containing at least two polymer blocks one of which is a crystalline polymer block and the other of which is an amorphous polymer block and a vulcanizable elastomer selected from the group consisting of EPDM, butyl, neutralized sulfonated EPDM, neutralized sulfonated butyl and mixtures thereof.

Elastomeric roofing compositions comprising blends of EPDM and butyl elastomers are known in the art as illustrated by U.S. Pat. Nos. 4,461,875 and 4,514,442. These patents relate to roofing compositions for use as roof sheeting or roof flashing which comprise 100 parts of an elastomer selected from the group consisting of EPDM, butyl rubber and an EPDM-butyl rubber mixture; 0.1 to 3.0 parts of a compound having the structural formula $[(CH_2)_nNCS]_2S_6$, where n is 4 or 5; and 0 to 0.5 parts of a sulfur donor curative.

Compositions for other end use applications which contain blends of elastomers or elastomeric polymers including blends of thermoplastic elastomers and vulcanizable or vulcanized elastomers are known in the polymer arts as illustrated by the following patents:

U.S. Pat. No. 4,442,253 to Lundberg et al. relates to blend compounds of an amine neutralized sulfonated elastomeric polymer and an unsulfonated elastomeric or thermoplastic polymer. As disclosed in this patent, the amine terminated neutralized sulfonated elastomeric polymer is prepared by reacting an amine terminated polylactone with a sulfonated polymer derived from EPDM, butyl, partially hydrogenated polyisoprenes, partially hydrogenated polybutadienes, neoprene, styrene-butadiene copolymers or isoprene-styrene copolymers. Unsulfonated elastomeric or thermoplastic polymers which may be utilized in the blend include butyl rubber, polyvinyl chloride, polyisobutylene, and polyester-based polyurethanes. The blend compositions may be utilized as adhesive agents, thermoplastic elastomers and compatabilizers for other polymers.

U.S. Pat. No. 4,313,867 to Duvdevani relates to injection moldable type elastomeric compositions comprising blends of a neutralized sulfonated EPDM terpolymer, a styrene-ethylene/butylene-styrene block copolymer, a non-polar process oil and optionally a polypropylene thermoplastic resin. The patent indicates that the compositions may be utilized to produce high performance elastomeric articles such as footwear.

U.S. Pat. No. 4,248,758 to Wright relates to a blend of a crosslinked EPDM polymer and a thermoplastic elastomer comprising a linear or branched teleblock copolymer having the formula A—B—A or $(A—B)_n—y$, wherein A represents a block of polymerized monovinyl—substituted aromatic compound units, B represents a block of polymerized conjugated diene units, y is a residual unit from a polyfunctional coupling agent or a polyfunctional initiating species and n has a value from 2 to 6. The patent indicates that the blend compositions have high green strength and ozone resistance and can be utilized in applications as molded articles such as shoe soles, toys, containers and pipes and can also be employed in tires, gaskets, pressure sensitive adhesives and sealing and caulking compositions.

U.S. Pat. No. 4,177,184 to Condon relates to polymeric blends having utility for use as automotive exterior parts which comprise a selectively hydrogenated monoalkenyl arene/diene multiblock copolymer, a polyolefin, a filler, a fatty acid amide and a synthetic rubberizing polymer. As defined in the patent, the multiblock copolymer has at least two polymer end blocks A and at least one polymer midblock B. Both blocks A and B may be either homopolymer, random or tapered copolymer blocks as long as the A blocks individually predominate in monoalkenyl arenes and the B blocks individually predominate in dienes. Synthetic rubberizing polymers disclosed in the patent include non-hydrogenated monoalkenyl arene-conjugated diene multiblock copolymers, selectively hydrogenated monoalkenyl arene-cojugated diene A—B two block copolymers wherein A and B are as defined above, ethylene-propylene copolymers, EPDM terpolymers, polyisobutylene, butyl rubber, polybutadiene and neoprene.

U.S. Pat. No. 4,102,849 to Bouton et al. relates to an oil-extended hydrogenated diblock copolymer composition comprising 10–200 parts of oil per 100 parts of hydrogenated diblock copolymer comprising one block of hydrogenated polybutadiene and one block of a hydrogenated random copolymer of a vinyl arene such as styrene and butadiene. The patent at column 6 lines 63–68, discloses that the hydrogenated diblock copolymer may be modified by the presence of asphalt, wax, polyvinyl compounds such as polystyrene, polymers of alpha-olefins such as polypropylene or polyethylene or it may be mixed with either natural or synthetic rubbers such as polyisoprene and polybutadiene. The patent indicates that the oil-extended hydrogenated diblock copolymers may be utilized in producing rubber hose, shoe soles, tires, industrial and automotive goods, etc.

U.S. Pat. No. 3,526,606 to Minekawa et al. relates to rubber compositions comprising a block copolymer, a rubber, a process oil and a filler. Block copolymers disclosed in the patent are styrene/butadiene block copolymers containing 60 to 95% by weight of styrene having the structure $B_1—A—B_2$, where $B_1$ and $B_2$ represent a polybutadiene or a 1,3-butadiene/styrene random copolymer block having a styrene content of less than 50% by weight, A represents a polystyrene block with the composition ratio of $B_1$ and $B_2$ blocks being respectively 5–90% by weight based on total weight of block copolymer and the composition ratio of the A block being respectively 5–75% by weight bssed on total weight of block copolymer. Rubbers which are disclosed in the patent include emulsion-polymerized butadiene/styrene copolymeric rubber, emulsion or solution polymerized polybutadiene rubber, solution-polymerized butadiene/styrene copolymeric rubber of low styrene content, polyisoprene rubber, emulsion polymerized butadiene/acrylonitrile copolymeric rubber, polychloroprene rubber or ethylene/propylene copolymeric rubber. The patent indicates that the rubber compositions may be utilized in shoe soles, hard vulcanized products and hard foamed products.

Thermoplastic elastomers containing a crystalline polymer block and an amorphous polymer block are also known in the art as illustrated by U.S. Pat. Nos. 3,634,549, 4,102,849 and 4,491,652.

U.S. Pat. No. 3,634,549 to Shaw et al relates to hydrogenated block copolymers in which the block copolymers prior to hydrogenation have the general formulae:

$$(A-B)_{1.5}(B-A)_{1.5}$$

and $$A-(B-A)_{1.5}$$

wherein each A is a polybutadiene block having an average molecular weight between about 5,000 and about 100,000 and each B is an elastomeric diene-monovinyl arene random copolymer block having an average molecular weight between about 25,000 and about 250,000 and a weight percent condensed monovinyl arene between about 5 and about 50, and wherein at least about 80% of the butadiene and any other diene double bonds are reduced by hydrogenation.

U.S. Pat. No. 4,102,849 to Bouton et al. described above discloses a hydrogenated diblock copolymer comprising one block of hydrogenated polybutadiene and one block of a hydrogenated random copolymer of a vinyl arene and butadiene. The hydrogenated diblock copolymer is a thermoplastic elastomer containing a crystalline polymer block formed by hydrogenation of polybutadiene and an amorphous polymer block formed by hydrogenation of the random vinyl arene-butadiene copolymer block.

U.S. Pat. No. 4,491,652 to Matthews et al. relates to a thermoplastic elastomer which is a sequentially prepared propylene and (ethylene-propylene) polymer or a sequentially prepared propylene, (ethylene-propylene) and propylene polymer. One of the thermoplastic elastomers disclosed is a thermoplastic elastomeric sequentially prepared polymer having (A) crystalline polypropylene segments of isotactic polypropylene and (B) amorphous segments of elastomeric ethylene-propylene, said segments (A) and (B) being partially block copolymerized to each other, the weight ratio of (A) to (B) segments being within the range from 10:90 to 75:25.

SUMMARY OF THE INVENTION

In accordance with the present invention, roofing compositions for forming roofing membranes and roof flashing materials are provided. The roofing compositions comprise a blend of:
(a) from about 5 to about 95 parts by weight of a thermoplastic elastomer containing at least two polymer blocks, wherein one of said polymer blocks is a crystalline polymer block having a Tm above 40° C. and one of said polymer blocks is an amorphous polymer block having a Tg of 0° C. or lower and wherein the weight ratio of crystalline polymer block to amorphous polymer block is within the range of from 10:90 to 80:20; and
(b) from about 5 to about 95 parts by weight of a vulcanizable elastomer selected from the group consisting of EPDM, butyl, neutralized sulfonated EPDM, neutralized sulfonated butyl and mixtures thereof.

These roofing compositions are readily processible into roofing membranes or roof flashing materials. The compositions have high mechanical strength in the unvulcanized state and upon vulcanization exhibit excellent weathering resistance, thermal resistance and oil and solvent resistance. The compositions depending upon their specific formulations may be cured by means of heat or by aging under ambient temperature conditions. In addition, roofing membranes formed from the compositions may be seamed together using an appropriate pressure sensitive adhesive or by means of heat welding.

DETAILED DESCRIPTION OF THE INVENTION

As indicated above, the thermoplastic elastomer component of the roofing compositions of the invention is a thermoplastic elastomer containing at least two polymer blocks, wherein one of said polymer blocks is a crystalline polymer blocks having a Tm (i.e. melting point) above 40° C. and one of said polymer blocks is an amorphous polymer block having a Tg of 0° C. or lower and wherein the weight ratio of crystalline polymer block to amorphous polymer block is within the range of from 10:90 to 80:20. A preferred thermoplastic elastomer of this type is one in which the crystalline polymer block has a Tm of from 60° to 165° C., the amorphous polymer block has a Tg of from −15° to −100° C. and the weight ratio of crystalline polymer block to amorphous polymer block is within the range of from 15:85 to 60:40. A particularly preferred thermoplastic elastomer is one in which the crystalline polymer block has a Tm of 70° to 140° C., the amorphous polymer block has a Tg of below −20° C. and the weight ratio of crystalline polymer block to amorphous polymer block is within the range of from 25:75 to 50:50.

In general, any thermoplastic elastomer having the above characteristics and which is compatible with the vulcanizable elastomer component may be utilized in the compositions of the invention. However, the preferred thermoplastic elastomers are block copolymers in which the crystalline polymer block is a hydrogenated block of polybutadiene and the amorphous polymer block is a hydrogenated block of a random copolymer of a vinyl arene (e.g. styrene) and 1,3-butadiene. It should be noted that while the preferred crystalline polymer block is a hydrogenated block of polybutadiene, this polymer block may also include small amounts (up to 20%) of a vinyl arene monomer or other monomers which are copolymerizable with 1,3-butadiene so long as this polymer block meets the above limitations. Moreover, other amorphous polymer blocks may be utilized instead of the preferred hydrogenated block of random copolymers. Thus, other amorphous polymer blocks may be employed including a hydrogenated block of a polybutadiene having a 1,2-microstructure content of from 35–90% prior to hydrogenation, a hydrogenated block of polyisoprene, a hydrogenated block of an isoprene/butadiene copolymer and the like. It should further be understood that these block copolymers may contain other polymer blocks in addition to the above hydrogenated blocks.

The particularly preferred thermoplastic elastomers for use in the compositions herein are hydrogenated diblock copolymers of the type described in U.S. Pat. No. 4,102,489, the disclosure of which is incorporated herein by reference. Especially preferred hydrogenated diblock copolymers of that type are those containing from 20–70 percent by weight of a hydrogenated block of a polybutadiene having a 1,2-microstructure content of less than 30 percent prior to hydrogenation and from 30–80 percent by weight of a hydrogenated block of a random copolymer of a vinyl arene (e.g. styrene) and 1,3-butadiene containing from 5–50 percent by weight of vinyl arene and 50–95 percent by weight of butadiene with the butadiene portion of the random copolymer having a 1,2-microstructure content of 5–80 percent prior to hydrogenation. These hydrogenated diblock copolymers have an average molecular weight of 15,000–1,000,000, preferably 20,000–500,000, as determined by viscosity measurement and a residual aliphatic unsaturation content of less than 20 percent, preferably less than 10 percent, of the original aliphatic unsaturation content prior to hydrogenation.

The hydrogenated diblock copolymers may be prepared in known manner by first preparing the non-hydrogenated diblock copolymer using known block copolymer polymerization processes and then hydrogenating the resultant diblock copolymer using known hydrogenation processes and hydrogenation catalysts. Thus, in preparing the non-hydrogenated diblock copolymer, various polymerization methods known in the art may be utilized. Preferably, the polybutadiene block is formed first and then, without deactivating the polymerization initiator, the random copolymer block is formed directly thereon. Alternatively, however, the random copolymer block may be formed first and then, without deactivating the polymerization initiator, the polybutadiene block may be formed directly thereon.

Vinyl arenes which may be employed in preparing the random copolymer block of the diblock copolymer include any vinyl or alpha-methyl vinyl arene compounds which are capable of being polymerized by an anionic initiator. Suitable vinyl arenes of that type include styrene, alphamethyl styrene, vinyl toluene, vinyl naphthalene and the like. The preferred vinyl arene is styrene.

The polybutadiene block of the diblock copolymer is generally prepared by polymerizing 1,3-butadiene in the presence of an organolithium initiator in an inert liquid hydrocarbon medium.

Organolithium initiators which may be employed are compounds having the formula R Li, wherein R is an aliphatic, cycloaliphatic or aromatic hydrocarbon radical containing from 1 to 20 carbon atoms. Suitable organolithium compounds include among others methyllithium, ethyllithium, iopropyllithium, n-butyllithium, sec-butyllithium, t-butyllithium, hexyllithium, n-decyllithium, cyclohexyllithium, phenyllithium, p-tolyllithium and the like. The preferred organolithium compounds are alkyllithium compounds containing from 1 to 8 carbon atoms in the alkyl radical and of these n-butyllithium is particularly preferred.

The inert liquid hydrocarbon employed as the polymerization medium is advantageously an alphatic hydrocarbon having 4–10 carbon atoms or an aromatic hydrocarbon having 6–10 carbon atoms which is inert to the polymerization initiator employed. The liquid hydrocarbon may be one in which the polymer is soluble or partly soluble or in which the polymer is suspended. Suitable liquid hydrocarbons include pentanes, hexanes, heptanes, cyclohexane, benzene and toluene with hexanes and cyclohexanes being preferred. Mixtures of these liquid hydrocarbons may also be utilized.

From 200 to 900 parts by weight of liquid hydrocarbon per 100 parts of monomer is generally sufficient to yield a fluid polymer solution or suspension which can be easily handled.

The temperature of the polymerization mass should be maintained between 0° and 175° C., preferably 50°–150° C.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

In one method of forming the random copolymer block, a styrene-butadiene monomer mixture in the desired ratio is fed into the reactor at such a rate that as the butadiene is continuously consumed the styrene is also copolymerized in a random repeating unit arrangement. This polymerization rate is affected by a number of factors, including the temperature, the solvent or diluent, the ratio of styrene to butadiene, the specific type of catalyst used, and the concentration of catalyst. It is also very important to have very efficient agitation to provide homogeneity and intimate contact of the various components.

When the monomer mixture feed rate is maintained slow enough to maintain a low instantaneous monomer concentration (starved condition), random copolymerization is effected. Random copolymerization may also be assured by adding all of the styrene initially to the polymerization system containing the polybutadiene block in the form of polybutadiene-Li and then adding the butadiene gradually at about or less than the rate at which it is being polymerized. Then with the system being maintained deficient in butadiene because it is being polymerized as fast as it is being fed into the system, the styrene is copolymerized to form the random copolymer block. After the butadiene is all added and polymerized, the remaining styrene monomer is swept from or otherwise removed from the system to avoid the formation of a terminal block of polystyrene. If the amount of styrene remaining is small, it may be polymerized since a very small terminal block of polystyrene will not be harmful. Up to 10% block polystyrene may be tolerated in the copolymer without harmful effects on the properties, and preferably there is no more than 5%. In another method of forming a random copolymer, a randomizer such as ether or an amine can be added to the polymerization system to promote random polymerization of butadiene and styrene.

The microstructure of the butadiene block in the basic non-hydrogenated polymer is important because it influences the properties of the resulting fully hydrogenated block copolymers. For example, block sequences derived from butadiene polymerized by 1,4 addition yield, upon hydrogenation, unsubstituted polyethylene sequences. Those units which enter the polymeric block via 1,2 addition polymerization yield ethyl-substituted ethylene units upon hydrogenation. The 1,2-content is advantageously below 30%, preferably below 20%.

The hydrogenation of the diene-vinyl arene diblock copolymer may be carried out by a variety of methods. The hydrogenation may be effected by placing the diene diblock copolymer in a hydrocarbon solution in the presence of a suitable catalyst and applying hydrogen gas under pressure to this solution. The method may be either continuous or a batch process.

The diblock polymer concentration may vary between about 0.5 percent to about 50 percent by weight of the hydrocarbon solution and preferably within a range of about 2 percent to about 35 percent.

Suitable solvents include saturated cyclic hydrocarbons, such as cyclohexane, methylcyclohexane, decalin, and the like, preferably boiling above atmospheric temperature. Aromatic hydrocarbons, such as benzene and toluene; and paraffinic hydrocarbons such as isooctanes, isoheptanes, normal heptane, hexane, pentane and the like; hydroaromatic hydrocarbons such as tetraline and the like, can also be used. Mixtures of solvents and/or dispersants can be used if desired.

In one embodiment, after the polymer has been dissolved in the solvent, the hydrogenation catalyst is added, hydrogen is added, and the temperature raised to a suitable level to initiate the reaction. Either the catalyst or the solution of polymer can be added in increments after the reaction temperature has been reached. This operation can be carried out in a batch-wise or a continuous process. When sufficient hydrogenation has been effected, usually indicated by a decrease in unsaturation or a drop in hydrogen pressure, the reaction is stopped and the dispersion or solution treated by suitable means, to deactivate or to remove the catalyst.

In the hydrogenation step, any catalyst known in the prior art may be used which is capable of converting aliphatic unsaturation to saturated product. Thus, the well known Raney nickel or nickel kieselguhr catalyst may be utilized. However, when using such catalysts, it is generally necessary to utilize a large amount of catalyst, a high reaction temperature (e.g. 150° to 200° C. or higher) and a high hydrogen pressure. Such high temperature hydrogenation condition can result in polymer degradation unless careful control of the hydrogenation process is exercised. Accordingly, it is desirable to employ a hydrogenation catalyst which permits the use of milder hydrogenation temperatures and pressures.

A preferred hydrogenation catalyst system for preparing the hydrogenated diblock copolymers of the compositions of the invention is disclosed in British Pat. No. 1,184,120, the disclosure of which is incorporated herein by reference. As described in the aforementioned patent, suitable catalyst for that purpose are prepared by mixing an organic compound of a metal selected from the goup consisting of nickel, cobalt and iron with an organometallic compound of a metal selected from Groups I, II and III of the periodic Table of the Elements. Such catalysts have the advantage that they are soluble in the solution copolymer and permit selective hydrogenation of diene units in a viscous solution under relatively mild conditions such as for example near room temperature and under atmospheric pressure of hydrogen.

Among the organic compounds of nickel, cobalt or iron, one of the preferred compounds is a metal carboxylate. The metal carboxylates include nickel naphthenate, cobalt naphthenate, iron naphthenate, nickel octoate, and cobalt octoate. Another preferred compound is a metal chelate compound. As the chelating groups, beta-diketones, beta-hydroxycarbonyl compound, and 8-hydroxyquinoline may be used. The metal chelate compounds include bis(acetylacetone) nickel, tris(acetylacetone) cobalt, bis(ethyl acetoacetate) nickel, bis(salicylaldehyde) nickel, bis(8-hydroxyquinoline) nickel, tris(8-hydroxyquinoline)-cobalt, and bis(3,5-diisopropylsalicyclic acid) nickel. The preferred organic compounds are nickel compounds and of these nickel octoate is especially preferred.

Among the organometallic compounds of the metals of Group I, II or III, a metal hydrocarbyl compound of lithium, magnesium or aluminium is preferably used. Examples of such metal hydrocarbyl compounds include n-butyllithium, diethylmagnesium, triethylaluminium, triisobutylaluminium, triamylaluminium, and diethylisobutylaluminium. In addition to the organometallic compound, the metal hydrides such as lithium aluminium hydride and sodium borohydride may be used. The preferred organometallic compounds are organoaluminium compounds and of these triethylaluminium is especially preferred.

Further, besides the above mentioned two component catalysts, a three component soluble catalyst consisting of the above mentioned two catalytic components and an olefinically or acetylenically unsaturated hydrocarbon is also preferably used. The soluble catalyst consisting of the above mentioned two or three catalytic components is easily removed from the hydrogenated copolymer by adding polar solvent such as acetone and alcohol to the reaction mixture containing the hydrogenated copolymer and precipitating the polymer. To make the removal of the catalyst residue more effective, it is preferable to contact the reaction mixture with polar solvent or water containing a small amount of acid. The catalysts used for preparing the hydrogenated copolymer used in the present invention are not limited to the above mentioned soluble catalyst. Other catalysts which can effect the selective hydrogenation of diene units of high molecular wieght copolymers without degradation or gelation may be used.

The amount of catalyst used in hydrogenating the diblock copolymers is dependent upon factors such as the particular type catalyst employed, the hydrogenation temperature and pressure and the like. When using the preferred nickel compounds, the quantity of catalyst may be varied within a range of from about 0.05 millimoles to 10 millimoles of nickel per 100 grams of polymer. In commercial applications, it is desirable to limit the residence time of hydrogenation and this may be achieved by using high catalyst to polymer ratios.

The diblock copolymers can be hydrogenated using the following ranges of reaction conditions. The concentration of copolymers to be hydrogenated may be from 0.5 to 50%, preferably from 2 to 35% by weight. Excellent hydrogenation efficiency is obtained by hydrogenation of a solution containing 10–20% of the block copolymers carried out at room temperature to 350° C., or even higher, preferably room temperature to 150° C., under hydrogen pressure from 1 atmosphere to 100 atmospheres, preferably 2–20 atmospheres. Reaction periods in the range of 0.5 to 24 hours, preferably 2 to 8 hours, can be employed.

In order to obtain polymers of the desired characteristics, the aliphatic unsaturation should be reduced to a value of approximately 0 to 20 percent, based upon the theoretical value of 100 percent for the unhydrogenated butadiene polymer. Preferably the residual aliphatic unsaturation in the products should be less than 10 percent.

The viscosities used to determine the molecular weight of the hydrogenated diblock copolymer are dilute solution viscosities (DSV). The dilute solution viscosity is defined as the inherent viscosity determined at 25° C. on a 0.4 percent solution of the polymer in toluene. The hydrogenated diblock copolymers employed in the compositions of the invention have DSV's ranging from 0.3 to 6.5, preferably 0.37 to 4.0, which corresponds to average molecular weights of from about 15,000 to 1,000,000, preferably from about 20,000 to about 500,000.

A more detailed description of processes for preparing the hydrogenated diblock copolymers used in the composition of the invention may be found in U.S. Pat. No. 4,102,849, the disclosure of which has been incorporated herein by reference. In addition, a specific method of preparing such diblock copolymers is disclosed in the examples below.

The roofing compositions of the invention may contain from about 5 to about 95, preferably from 10 to 80, parts by weight of the thermoplastic elastomer based upon 100 parts total combined weight of thermoplastic elastomer and vulcanizable elastomer components.

As indicated above, the second major component of the roofing compositions of the invention is a vulcanizable elastomer selected from the group consisting of EPDM, butyl, a neutralized sulfonated EPDM, a neutralized sulfonated butyl and mixtures thereof.

The term "EPDM" is used in the sense of its definition as found in ASTM-D-1481-64 and is intended to mean a terpolymer of ethylene, propylene and a diene monomer. Illustrative methods for preparing such terpolymers are found in U.S. Pat. No. 3,280,082 and British Pat. No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon 2504 (Exxon Chemical Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an $M_n$ as measured by GPC of about 47,000 and an $M_w$ as measure by GPC of about 174,000. Another typical EPDM is Nordel 1070 an ethylene/propylene/1,4-hexadiene terpolymer having an $M_n$ of 87,000 and an $M_w$ of 188,000 available from duPont.

Butyl or butyl rubber is a term commonly used to describe copolymers made from a polymerization reaction mixture containing from 70 to 99.5% by weight of an isoolefin having 4 to 7 carbon atoms, e.g. isobutylene, and 0.5 to 30% by weight of a conjugated multiolefin having 4 to 14 carbon atoms, e.g. isoprene. The resultant copolymer generally contains 85 to 99.8% by weight of combined isoolefin and 0.2 to 15% by weight of combined multiolefin. Butyl rubbers employed in the compositions of the invention may have incorporated therein from about 0.2 to 10% of combined multiolefin preferably from about 0.5 to about 6.0%.

Butyl rubber generally has a Staudinger molecular weight of 20,000 to 500,000, preferably 25,000 to 400,000, especially 100,000 to 400,000, and a Wijs Iodine No. of 0.5 to 50, preferably 1 to 15. The preparation of butyl rubber is described in U.S. Pat. No. 2,356,128, the disclosure of which is incorporated herein by reference.

Neutralized sulfonated EPDM and butyl elastomers which may be employed in the compositions of the invention are well known in the art. The preferred neutralized sulfonated elastomers are those having from about 10 to about 100, preferably from about 10 to about 30 milliequivalents (hereinafter meq) of neutralized sulfonate groups per 100 grams of elastomer. It should be noted at this time that the term "neutralized" as used in the foregoing context is intended to encompass either complete neutralization of the sulfonate groups or partial neutralization of the sulfonate groups.

The neutralized sulfonated EPDM or butyl elastomer can be prepared by methods known in the art. Thus, for example, the neutralized sulfonated EPDM or butyl elastomer may be prepared by first sulfonating an EPDM or butyl elastomer using a complex of a sulfur trioxide donor and a Lewis base and then neutralizing the sulfonated EPDM or butyl elastomer with a basic material selected from an organic amine and a mono-, di-, tri- or tetravalent metal ion of a metal of Groups I, II, III, IV, V, VI-B, VII-B and VIII of the Periodic Table of the Elements as described in U.S. Pat. No. 3,642,728, the disclosure of which is incorporated herein by reference.

The EPDM or butyl elastomer can also be sulfonated using a sulfonating agent selected from acetyl sulfate, propionyl sulfate and butyryl sulfate as described in U.S. Pat. No. 3,836,511, the disclosure of which is incorporated herein by reference.

The preferred neutralized sulfonated EPDM and butyl elastomers for use in the compositions of the invention are zinc neutralized sulfonated EPDM and butyl elastomers such as those described in U.S. Pat. Nos. 4,137,203 and 4,222,914, the disclosures of which are incorporated herein by reference. A particularly preferred zinc neutralized sulfonated EPDM elastomeric terpolymer for use in the compositions herein is a zinc sulfonated EPDM having a base EPDM molecular weight, Mn, of 50,000, an average number of $SO_3$-groups/molecule of 13, 2.7% by weight ionic groups, a bulk density of 8-10 lbs./cu. ft., a Tg of $-60°$ C. and 25 meq of zinc sulfonate groups per 100 grams of terpolymer available under the designation IE2590 from Uniroyal Chemical Company, Inc.

The roofing compositions of the invention may contain from about 5 to about 95, preferably from 20 to 90, parts by weight of the vulcanizable elastomer based upon 100 parts total combined weight of thermoplastic elastomer and vulcanizable elastomer components.

In addition to the thermoplastic elastomer and vulcanizable elastomer components, the roofing compositions of the invention may contain various conventional rubber compounding and vulcanizing ingredients. Thus, the compositions may contain fillers, processing or softening oils (i.e. plasticizers), antioxidants, antiozonants, UV stabilizers, vulcanizing agents, vulcanizing accelerators, cure retarders, processing aids, tackifying resins, flame retardants and the like.

Fillers which may be utilized include carbon black, silica, silicates, clay, talc, mica, calcium carbonate and the like. Mixtures of such fillers may also be employed.

The roofing compositions may contain from about 10 to about 400, preferably from 25 to 250, parts by weight of such fillers or filler mixtures.

Vulcanizing agents which may be utilized include sulfur and sulfur donor compounds. Mixtures of sulfur and sulfur donor compounds may also be utilized and such mixtures are in most instances preferred. Sulfur donor compounds which may be employed in the compositions include thiuram polysulfides such as tetramethylthiuram disulfide, tetraethylthiuram disulfide, diisopropylthiuram disulfide, tetrabutylthiuram disulfide, dipentamethylenethiuram tetrasulfide, dipentamethylenethiuram hexasulfide, dicyclohexamethylenethiuram disulfide, phenylethylthiuram disulfide and the like; and salts of dialkyldithiocarbamates such as zinc dibutyldithiocarbamate, zinc dimethyldithiocarbamate, zinc diethyldithiocarbamate, bismuth dimethyldithiocarbamate, nickel dibutyldithiocarbamate, copper dimethyldithiocarbamate, selenium diethyldithiocarbamate, lead dimethyldithiocarbamate, tellurium dimethyldithiocarbamate, tellurium diethyldithiocarbamate, cadium diethyldithiocarbamate and the like. It should be appreciated that this list is not exclusive and other sulfur donor compounds known in the art may be utilized.

Amounts of sulfur, sulfur donor compounds or mixtures thereof employed in the compositions may range from about 0.5 to about 6.0 parts by weight with preferred amounts ranging from 1.0 to 4.0 parts by weight.

In addition to the sulfur or sulfur donor compound vulcanizing agents, one or more vulcanizing accelerators may be included in the compositions. Vulcanizing accelerators which may be employed include thioureas such as ethylene thiourea, N,N'-dibutylthiourea, N,N'-diethylthiourea and the like; thiuram monosulfides such as tetramethylthiuram monosulfide, tetraethylthiuram monosulfide, tetrabutylthiuram monosulfide and the like; benzothiazole sulfenamides such as N-oxydiethylene benzothiazole-2-sulfenamide, N-cyclohexyl benzothiazole-2-sulfenamide, N,N-diisopropyl benzothiazole-2-sulfenamide, N-tert-butyl benzothiazole-2-sulfenamide and the like; 2-mercaptoimidazoline; N,N-diphenyl-guanidine; N,N'-di(2-methylphenyl) guanidine; 2-mercaptobenzothiazole, 2-(morpholinodithio)benzothiazole disulfide and zinc 2-mercaptobenzothiazole.

The roofing compositions used in the manufacture of roof sheeting or flashing may be prepared by mixing the ingredients of the composition in an internal mixer, for example, a Banbury mixer, an extruder and/or a two-roll mill. In the type B Banbury internal mixer, the dry or powdery materials are added rapidly followed by the addition of any liquids, e.g. process oils, plasticizers etc. and finally the elastomers. This type of mixing is often referred to as an upside-down mixing technique.

The roofing compositions may be prepared in sheet form in known manner by calendering or extrusion and then cutting the sheet to desired dimensions. The sheets may be cut for use as roof sheeting or flashing. Roof sheeting membrane and roof flashing are manufactured from rubber compounds and are typically evaluated for physical properties using test methods developed for mechanical rubber goods. Typical properties include tensile strength, modulus, ultimate elongation, tear resistance, ozone resistance, water absorption and hardness.

As indicated, a principal application of the roofing compositions of the invention is to form roof sheeting or membrane for use as a roof covering. The types of roof which are preferably covered by the roofing membrane are flat or slightly sloped roofs. The roof surface which is covered by the roofing membrane, commonly referred to as a roof deck, may be wood, cement, metal, concrete or combinations thereof. In addition, the roofing membrane may be affixed to insulation which may be disposed over the aforementioned roof decks. Insulation such as wood fiberboard, expanded polystyrene, fiberglass board and rigid polyurethane board may be covered with the roofing membrane. In installing the roof covering or membrane, the membrane may be fully bonded to the roof surface, partially bonded to the roof surface, loose laid and ballasted, or mechanically bonded by methods such as battens, discs or buttons.

In addition to its use as a roof covering, the roof membrane formed from the roofing compositions of the invention may be employed in the closely related function of roof flashing. In this function, the membrane covers roof protrusions, drains, gutters, outlets, edge trims, parapet wall terminations, corners and other roof details.

The roofing membranes formed from the roofing compositions of the invention provide the same water impermeability and weather resistance as the vulcanized elastomeric EPDM and butyl roofing membranes of the prior art. However, because such elastomers are thermosetting elastomers after vulcanization they can only be formed during installation into the large panels necessary for use as roof coverings by means of adhesive bonding of smaller sized panels or membranes.

In contrast, the roofing membranes formed from the roofing compositions of the present invention may be seamed together to provide the large panel sizes necessary for roof coverings by various methods. Thus, roofing membranes formed from the roofing compositions herein may be seamed together by heat sealing, solvent welding, adhesive bonding, tape bonding or combinations thereof. The preferred means of seaming is that method not available to the thermosetting rubbers of the prior art, namely, heat sealing. When heat sealing is employed, the most desirable method is hot air welding. It will be noted that heat sealing by such means as hot air welding provides a high strength integral bond without the introduction of any foreign material.

The following examples are submitted for the purpose of further illustrating the nature of the present invention and are not to be considered as a limitation on the scope thereof but are exemplary only. Parts and percentages shown in the examples are by weight, unless otherwise indicated.

EXAMPLE A

This example illustrates the preparation of the thermoplastic elastomer (TPE) component of the roofing compositions of the invention. The TPE component is a hydrogenated diene-vinyl arene diblock copolymer which was prepared by first preparing a diene-vinyl arene diblock copolymer and then hydrogenating the diblock copolymer in accordance with the following procedure:

(a) Preparation of Diene-Vinyl Arene Diblock Copolymer

The starting diblock copolymer is prepared in a stainless steel reactor equipped with a stirrer, a temperature control means, and inlet and outlet means. A blend of butadiene and hexane containing about 25% butadiene is introduced, following which a solution of n-butyl lithium is added. The butadiene blend has been pretreated or is selected so as to be free of any traces of materials that will react with or poison the initiator. The amounts of butadiene and initiator are selected to give the desired molecular weight for the ultimate polybutadiene block of the diblock copolymer. This is calculated by the formula:

$$\text{Molecular weight} = \text{grams butadiene/moles of n-butyl lithium.}$$

The temperature is raised to 55° C. and polymerization is completed at the end of 2 hours. Then the temperature is raised to 110° C.; a butadiene/styrene/hexane blend, containing butadiene and styrene in the ratio desired in the random copolymer block, is fed gradually into the reactor over a period of 2 to 3 hours. More rapid feeding is avoided so as to avoid the formation of a terminal polystyrene block. Polymerization is continued for about 10-15 minutes after the addition of blend has been completed. The amount of butadiene and styrene thus added is calculated on the basis of the molecular weight desired for the random copolymer block of the diene copolymer block and according to the number of moles of polybutadiene-Li present when the feeding of the mixed monomer blend is initiated. Here again, the monomer blend is pretreated or selected to avoid the presence of any catalyst poisons. The reaction mass is cooled to room temperature in a sealed container or retained in the reactor in an appropriate amount for hydrogenation as described in (b) below.

(b) Hydrogenation of Diene-Vinyl Arene Diblock Copolymer

To a 50 lb. charge of the base copolymer prepared in (a) and contained in the same reactor, there is added 40 lbs. of additional hexane to reduce the solution viscosity. The temperature is then raised to 150° C. and about 10 lbs. of the hexane is distilled off to insure that all possible traces of moisture are removed. The hydrogenation catalyst (Ni octoate/cyclohexene/triethylaluminum in 1/1/3 ratio) is added in an amount to give 0.01 moles of Ni octoate per 100 grams of diblock copolymer. Hydrogen is introduced and a hydrogen pressure of 150 psig maintained at 105° C. for 10 hours. The polymer is then substantially completely saturated at that time. The reaction solution is then dropped under a nitrogen atmosphere into a drum containing methanol and antioxidant and mixed well to give a precipitate of the hydrogenated diblock copolymer.

The resultant hydrogenated diblock copolymer contains 35% by weight of a hydrogenated polybutadiene block and 65% by weight of a hydrogenated random copolymer block of butadiene and styrene containing 55 percent of butadiene and 45% of styrene. The hydrogenated diblock copolymer has a molecular weight of 100,000, a styrene content of 29.25%, a melting point, Tm, of 100° C., a Tg of −25° C. and is 99.5% hydrogenated.

EXAMPLES 1–3

These examples illustrate roofing compositions of the invention comprising blends of EPDM and the thermoplastic elastomer (TPE) of Example A. For comparative purposes a composition containing EPDM which is conventionally employed in roofing compositions (designated $C_1$ for convenience) and a composition containing the TPE of Example A (designated $C_2$ for convenience) were included to serve as controls. The compositions had the following formulations:

| Ingredients | Parts by Weight Example | | | | |
|---|---|---|---|---|---|
| | $C_1$ | $C_2$ | 1 | 2 | 3 |
| EPDM[1] | 100.00 | — | 62.20 | 45.50 | 33.00 |
| TPE of Ex A | — | 100.00 | 37.80 | 54.50 | 67.00 |
| GPF black[2] | 133.00 | 90.00 | 116.70 | 109.50 | 104.20 |
| Paraffinic process oil | 70.00 | — | 43.50 | 31.80 | 23.10 |
| Naphthenic process oil | — | 58.30 | 22.00 | 31.80 | 39.10 |
| Zinc oxide | 5.00 | 4.16 | 4.68 | 4.58 | 4.44 |
| Stearic acid | 1.00 | 0.83 | 0.94 | 0.91 | 0.89 |
| Santoflex 13[3] | — | 1.25 | 0.47 | 0.63 | 0.84 |
| Sulfur | 1.03 | 0 | 1.03 | 1.03 | 1.03 |
| TMTDS[4] | 0.65 | 0 | 0.65 | 0.65 | 0.65 |
| TETDS[5] | 0.65 | 0 | 0.65 | 0.65 | 0.65 |
| Santocure NS[6] | 1.94 | 0 | 1.94 | 1.94 | 1.94 |
| Total | 313.27 | 254.54 | 292.56 | 283.49 | 276.84 |

[1]70:30 blend of Royalene 512 (an EPDM terpolymer containing 49.9% ethylene, 48.0% propylene and 2.1% 5-ethylidene-2-norbornene having a Mooney viscosity, ML1 plus 4, at 125° C. of about 53 available from Uniroyal Chemical Company) and Royalene 2859 (an EPDM terpolymer containing 56.5% ethylene, 39.4% propylene and 4.1% 5-ethylidene-2-norbornene, having a Mooney Viscosity, ML1 plus 4, at 125° C. of 52, available from Uniroyal Chemical Company)
[2]General Purpose Furnace Carbon black
[3]Paraphenylene diamine
[4]Tetramethylthiuram disulfide
[5]Tetraethylthiuram disulfide
[6]N—Tertiary-butyl benzothiazole-2-sulfenamide The above formulations were compounded using the following procedure. The formulations of Examples $C_1$ and $C_2$ were prepared by first mixing the elastomers, oils, fillers, zinc oxide, stearic acid and Santoflex 13 (Ex. $C_2$) in a Prepcenter Brabender having a jacket temperature of 250° F. to form rubber masterbatches. The batches were dumped at a temperature of 300° F. Then, the rubber masterbatches were mill mixed with the cure package, i.e. sulfur, TMTDS, TETDS and Santocure NS. The temperature of the mill mixed stock was not allowed to exceed 220 F.°. The formulations of Examples 1–3 were prepared by blending the rubber masterbatches of Examples $C_1$ and $C_2$ in the proper ratios and then adding the cure package.

The resultant compounds were tested for stress-strain properties in the uncured state and after aging for 1 month at 150° F. in an oven. The oven aging test was conducted to simulate roof top curing conditions. Test conditions and results are shown in Table I.

TABLE I

| | Example | | | | |
|---|---|---|---|---|---|
| | $C_1$ | $C_2$ | 1 | 2 | 3 |
| Stress-Strain Properties at 73° F. - Uncured Slabs | | | | | |
| 100% Modulus, psi | 90 | 550 | 280 | 296 | 328 |
| Tensile Strength, psi | 134 | 1560 | 550 | 640 | 760 |
| Elongation at break, % | 700 | 475 | 360 | 360 | 560 |
| Stress Strain Properties at 73° F. - Slabs oven aged 1 month at 150° F. | | | | | |
| 100% Modulus, psi | 493 | 583 | 583 | 661 | 672 |
| Tensile Strength, psi | 1630 | 1500 | 1800 | 2000 | 2000 |
| Elongation at break, % | 290 | 425 | 320 | 560 | 370 |

As shown by the above data, roofing compositions of the invention as embodied in Examples 1–3 exhibit high strength properties in the uncured state compared to the conventional EPDM based roofing composition of Example $C_1$ and after heat aging exhibit higher strength properties as indicated by tensile strength than either the EPDM based or TPE based compositions of Examples $C_1$ and $C_2$.

EXAMPLES 4–7

These examples illustrate roofing compositions of the invention comprising blends of the TPE of Example A with EPDM or neutralized sulfonated EPDM. The compositions had the following fomulations:

| Ingredients | parts by weight Example | | | |
|---|---|---|---|---|
| | 4 | 5 | 6 | 7 |
| EPDM[1] | 20.00 | — | — | — |

-continued

| Ingredients | parts by weight Example | | | |
|---|---|---|---|---|
| | 4 | 5 | 6 | 7 |
| IE1025[2] | — | 20.00 | 40.00 | — |
| IE 2590[3] | — | — | — | 40.00 |
| TPE of EX. A | 80.00 | 80.00 | 60.00 | 60.00 |
| GPF black | 123.00 | 123.00 | 123.00 | 123.00 |
| Processing Oil | 65.00 | 65.00 | 65.00 | 65.00 |
| Zinc oxide | 5.00 | 5.00 | 5.00 | 5.00 |
| Stearic acid | 1.00 | 1.00 | 1.00 | 1.00 |
| Sulfur | 0.70 | 0.70 | 0.70 | 0.70 |
| TMTDS | 0.50 | 0.50 | 0.50 | 0.50 |
| TETDS | 0.50 | 0.50 | 0.50 | 0.50 |
| Santocure NS | 2.40 | 2.40 | 2.40 | 2.40 |
| TOTAL | 298.10 | 298.10 | 298.10 | 298.10 |

[1]Same as in examples 1-3.
[2]A zinc sulfonated EPDM having a base EPDM molecular weight of 50,000, an average number of $SO_3$—groups per molecule of 5, 1.1% by weight ionic groups, a bulk density of 8-10 lbs per cubic foot, a Tg of $-60°$ C. and 10 meg of zinc sulfonate groups, per 100 groups of terpolymer, available from Uniroyal Chemical Company.
[3]A zinc sulfonated EPDM having a base EPDM molecular weight of 50,000, an average number of $SO_3$—groups per molecule of 13, 2.7% by weight ionic groups, a bulk density of 8-10 lbs per cubic feet, a Tg of $-60°$ C. and 25 meg of zinc sulfonate groups per 100 groups of terpolymer, available from Uniroyal Chemical Company.

The above formulations were prepared substantially in accordance with the procedure set forth in Examples 1–3.

The resultant compounds were tested for stress-strain properties at 73° F. and for tear resistance. Test conditions and results are shown in Table II.

TABLE II

| | Example | | | |
|---|---|---|---|---|
| | 4 | 5 | 6 | 7 |
| Stress-Strain at 73° F. | | | | |
| 100% Modulus, psi | 633 | 768 | 654 | 584 |
| Tensil Strength, psi | 1100 | 1260 | 1132 | 900 |
| Elongation, % | 405 | 330 | 370 | 355 |
| Crescent Tear, Die "C" *(lbs/in) | | | | |
| 73° F. | 270 | 304 | 275 | 214 |
| 150° F. | 99 | 120 | 108 | 69 |

*Tear test conducted in accordance with ASTM D624-81.

EXAMPLES 8–10

These examples further illustrate roofing compositions of the invention comprising blends of EPDM and the TPE of Example A. For comparative purposes, a composition containing EPDM as the sole polymer (designated $C_3$) and a composition containing the TPE of Example A as the sole polymer (designated $C_4$) were included to serve as controls. The compositions had the following formulations:

| Ingredients | Parts by Weight Example | | | | |
|---|---|---|---|---|---|
| | $C_3$ | $C_4$ | 8 | 9 | 10 |
| EPDM | 100.00 | — | 80.00 | 50.00 | 20.00 |
| TPE of Ex A | — | 100.00 | 20.00 | 50.00 | 80.00 |
| GPF black | 133.00 | — | 106.00 | 67.00 | 27.00 |
| Clay | — | 162.00 | 32.00 | 81.00 | 130.00 |
| Paraffonic process oil | 83.00 | — | 66.00 | 42.00 | 17.00 |
| Naphthenic process oil | — | 60.00 | 12.00 | 30.00 | 48.00 |
| Zinc oxide | 5.00 | 5.00 | 5.00 | 5.00 | 5.00 |
| Stearic acid | 1.00 | 1.00 | 1.00 | 1.00 | 1.00 |
| Sulfur | 0.70 | 0 | 0.70 | 0.70 | 0.70 |
| TMTDS | 0.50 | 0 | 0.50 | 0.50 | 0.50 |
| TETDS | 0.50 | 0 | 0.50 | 0.50 | 0.50 |
| Santocure NS | 2.40 | 0 | 2.40 | 2.40 | 2.40 |
| TOTAL | 323.70 | 328.00 | 326.10 | 330.10 | 332.10 |

*same as in examples 1-3

The above formulations were prepared substantially in accordance with the procedure set forth in Examples 1–3. The resultant compounds were tested for unaged and aged stress-strain properties, unaged and aged tear resistance, hardness, brittle paint, ozone resistance and water resistance. Test conditions and results are shown in Table III.

TABLE III

| | Example | | | | |
|---|---|---|---|---|---|
| | $C_3$ | $C_4$ | 8 | 9 | 10 |
| Cure conditions: | 20' at 328° F. | un-cured | 20' at 328° F. | 20' at 328° F. | 20' at 328° F. |
| Unaged Properties | | | | | |
| Stress-strain at 73° F. | | | | | |
| Tensile, psi | 1680 | 1450 | 1530 | 1590 | 1490 |
| Elongation, % | 460 | 620 | 500 | 570 | 570 |
| Crescent Tear at 73° F. | | | | | |
| Die C lbs/in. | 260 | 282 | 260 | 270 | 290 |
| Shore "A" hardness at 73° F. | 65 | 76 | 71 | 70 | 70 |
| Brittle Point, ° C. | −56 | −30 | −45 | −45 | −40 |
| Aged Properties | | | | | |
| Stress-strains at 73° F. | | | | | |
| (aged 28 days at 240° F.) | | | | | |
| Tensile, psi | 2000 | 1380 | 1760 | 1470 | 1450 |
| Elongation, % | 200 | 210 | 260 | 260 | 260 |
| Crescent Tear at 73° F. | | | | | |
| Die C lbs/in (aged 28 days at 240° F.) | 215 | 276 | 232 | 247 | 282 |
| Ozone Resistance-7 days/10 pphm Ozone at 100° F. with 50% stock extension ASTM D-1149 | | | | | |
| Inspection rating* | N.C. | N.C. | N.C. | N.C | N.C. |
| Water Resistance-change in mass after Immersion for 7 days at 172° FASTMD479 | | | | | |
| Increase in wt, % | 2.5 | 1.7 | 2.4 | 2.1 | 2.3 |

*N.C. = no cracking

EXAMPLE 11

This example illustrates a very important property possessed by the roofing compositions of the invention, namely, that roofing membranes formed from these compositions may be seamed together by means of heat sealing. The heat sealing property provided by these compositions was evaluated using the following procedure.

A roofing composition having the following formulation was first prepared substantially in accordance with the procedure of Examples 1–3:

| Ingredients | Parts by Weight |
|---|---|
| TPE of Ex. A | 70.00 |
| EPDM | 30.00 |
| Processing oil | 70.00 |
| GPF black | 40.00 |
| Clay | 113.00 |
| Polyethylene | 10.00 |
| Zinc oxide | 5.00 |
| Stearic acid | 1.00 |
| Antioxidant | 1.00 |
| Sulfur | 0.70 |
| TMTDS | 0.50 |
| TETDS | 0.50 |
| Santocure NS | 2.40 |

-continued

| Ingredients | Parts by Weight |
|---|---|
| Total | 344.10 |

The resultant compound was then sheeted out on a mill to 0.060" thickness and cut into 2 plaques with each plaque having the dimensions 6"×6"×0.060". Each plaque was then cured for a sufficient time to produce a 90% cure level as determined by Monsanto Rheometer at 300° F. A 2" side strip of plastic tape was placed across one end of one of the plaques to provide an unseamed area for adhesion test strip purposes. The plaques were then manually pressed together face to face to form an adhesion test pad. The resultant test pad was placed between press platens with no pressure being applied and heated to 310° F. in 45 seconds. The test pad was then removed from the platens and rolled with a 5.0 lb roller before the temperature had dropped to 250° F. The adhesion test pad was allowed to age for 10 days at room temperature before testing for peel adhesion. After this time period, the 6"×6" test pad was cut into 6 one inch wide strips with the top 2 inches of each strip being unseamed. Certain of the test strips were evaluated for unaged peel adhesion at 77° F. and 180° F. while certain of the test strips were evaluated for peel adhesion after aging for 5 days at 180° F. in an oven and then testing at 77° F. and 180° F. Peel adhesion of each test strip was conducted on an Instron tester operating at 2" per minute using the 180°T peel adhesion test set forth in ASTM D-1876. Peel adhesion conditions and results are shown in Table IV.

For comparative purposes, the peel strength of a seam formed by bonding two 6"×6"×0.060" plaques of a conventional cured EPDM roofing membrane with a commercial Uniroyal Chemical Company splicing adhesive was evaluated. The plaques of conventional cured EPDM roofing membrane were bonded together with the commercial Uniroyal splice adhesive and tested for peel adhesion utilizing the following general procedure:

The two 6"×6"×0.060" plaques of compounded and cured EPDM roofing membrane were washed with unleaded gasoline and a nylon scrub brush. After drying for several minutes, the plaques were coated with a commercial Uniroyal splice adhesive using a paint brush. Approximately 4-5 ml was used to cover a 4"×6" area of each 6"×6" plaque. The adhesive was allowed to dry for 15 minutes at room temperature (23°-24° C.). The plaques were then placed face to face, adhesive side to adhesive side, and manually pressed together to bond the plaques together. Then, the resultant adhesion pad was rolled with a 5.0 lb roller across the width of the pad at a rate of about 2" per second. This was repeated 4 times. The pad was then allowed to dry at room temperature for one week before being tested for peel adhesion. The 6"×6" pad was then cut into 6 one inch wide test strips with the top 2 inches of each strip having no adhesive applied hereto. The test strips were then evaluated for unaged and aged peel adhesion using the peel adhesion test and test conditions described above. Peel adhesion conditions and results are shown in Table IV.

TABLE IV

| Roofing membrane | Cured 70/30 TPE/EPDM Roofing Composition of Ex 11 | Cured conventional EPDM Roofing Composition |
|---|---|---|
| Seaming Method | Heat welding | Adhesive bonding |
| Peel adhesion, PLI* | | |
| Unaged | | |
| Test Temp 77° F. | 19.5 | 2-9 |
| Test Temp. 180° F. | 0.9 | 0.7 |
| Aged 5 days at 180° F. | | |
| Test Temp. 77° F. | 23.9 | 2-9 |
| Test Temp. 180° F. | 12.3 | 0.7 |

*PLI = pounds per linear inch.

As clearly indicated by the above data, roofing membranes formed from the roofing compositions of the inventions can be seamed together by means of heat sealing even when the compositions are cured and the seams exhibit superior peel adhesion strength as compared to the peel adhesion strength of seams of roofing membranes formed by bonding cured conventional EPDM roofing membranes together using commercial adhesives.

I claim:

1. A roofing composition comprising a blend of:
    (a) from about 5 to about 95 parts by weight of a thermoplastic elastomer containing at least two polymer blocks, wherein one of said polymer blocks is a crystalline polymer block having a Tm above 40° C. and one of said polymer blocks is an amorphous polymer block having a Tg of 0° C. or lower and wherein said thermoplastic elastomer contains from about 10 to about 80 percent by weight of crystalline polymer block and from about 20 to about 90 percent by weight of amorphous polymer block; and
    (b) from about 5 to about 95 parts by weight of a vulcanizable elastomer selected from the group consisting of an ethylene, propylene, diene monomer terpolymer, butyl, neutralized sulfonated ethylene, propylene, diene monomer terpolymer, neutralized sulfonated butyl and mixtures thereof.

2. The composition of claim 1 wherein said thermoplastic elastomer is a hydrogenated diblock copolymer consisting essentially of from about 20 to about 70 percent by weight of a hydrogenated block of polybutadiene and from about 30 to about 80 percent of a hydrogenated block of a random copolymer of a vinyl arene and 1,3-butadiene containing from about 5 to about 50 percent by weight of vinyl arene and from about 50 to about 95 percent by weight of butadiene, said hydrogenated diblock copolymer having a residual unsaturation content of less than 20% of the original unsaturation level prior to hydrogenation.

3. The composition of claim 2 wherein said vinyl arene is styrene.

4. The composition of claim 2 wherein said polybutadiene has a 1,2-microstructure content of less than 30% prior to hydrogenation.

5. The composition of claim 1 wherein said vulcanizable elastomer is an ethylene, propylene, diene monomer terpolymer.

6. The composition of claim 1 wherein said vulcanizable elastomer is a neutralized sulfonated EPDM.

7. The composition of claim 1 wherein said blend comprises from 10 to 80 parts by weight of said thermoplastic elastomer and from 20 to 90 parts by weight of said vulcanizable elastomer.

8. The composition of claim 1 further comprising vulcanizing agents selected from the group consisting of sulfur, sulfur donor compounds and mixtures thereof.

9. The compositions of claim 8 wherein said sulfur donor compounds are selected from the group consisting of thiuram polysulfides and salts of dialkyldithiocarbomates.

10. The composition of claim 8 further comprising vulcanizing accelerators.

11. The composition of claim 10 wherein said vulcanizing accelerators are selected from the group consisting of thioureas, thiuram monosulfides and benzothiazole sulfenamides.

12. The composition of claim 1 further comprising fillers, processing or softening oils, antioxidants, antiozonants, UV stabilizers, cure retarders, processing aids, tackifying resins and flame retardants.

13. The composition of claim 8 further comprising fillers, processing or softening oils, antioxidants, antiozonants, UV stabilizers, cure retarders, processing aids, tackifying resins and flame retardants.

* * * * *